May 10, 1966  W. R. DETWILER  3,250,553
NESTED KEY CONSTRUCTION FOR SLIDABLE PULLEY SECTIONS
Original Filed Dec. 23, 1963  2 Sheets-Sheet 1
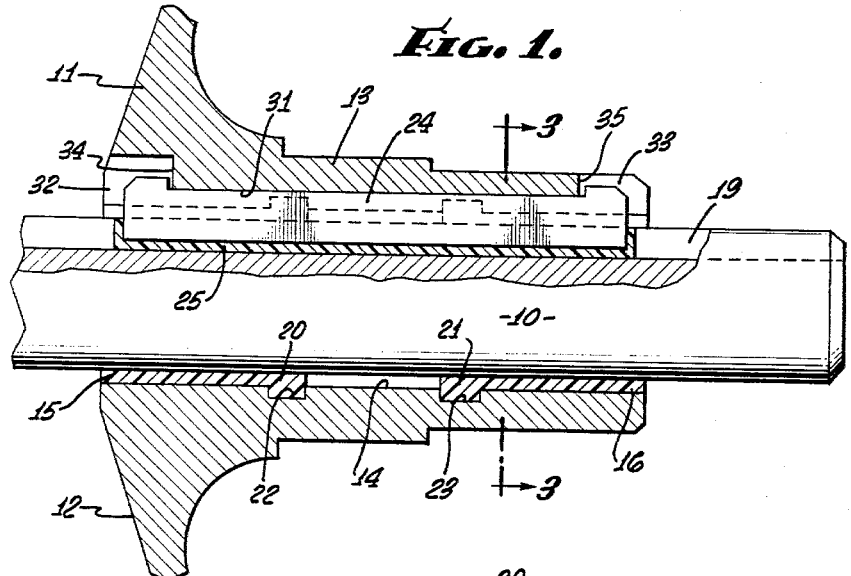
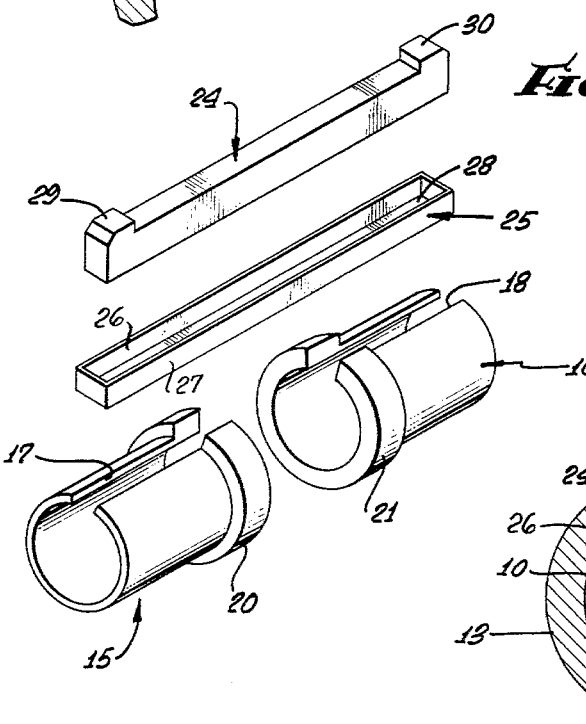
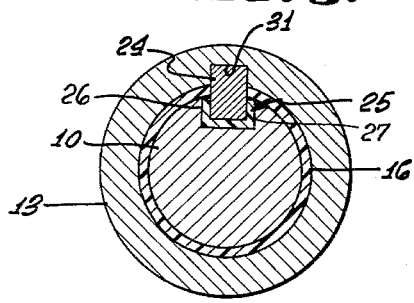
INVENTOR.
WILLARD R. DETWILER
BY Flam and Flam
ATTORNEYS.

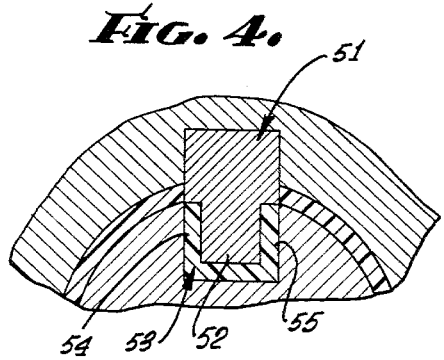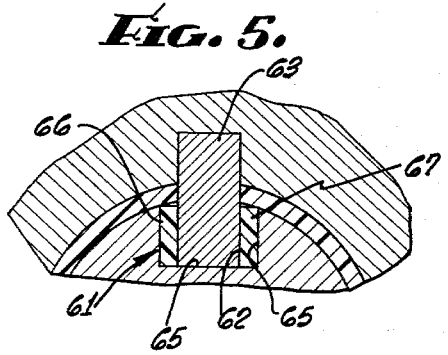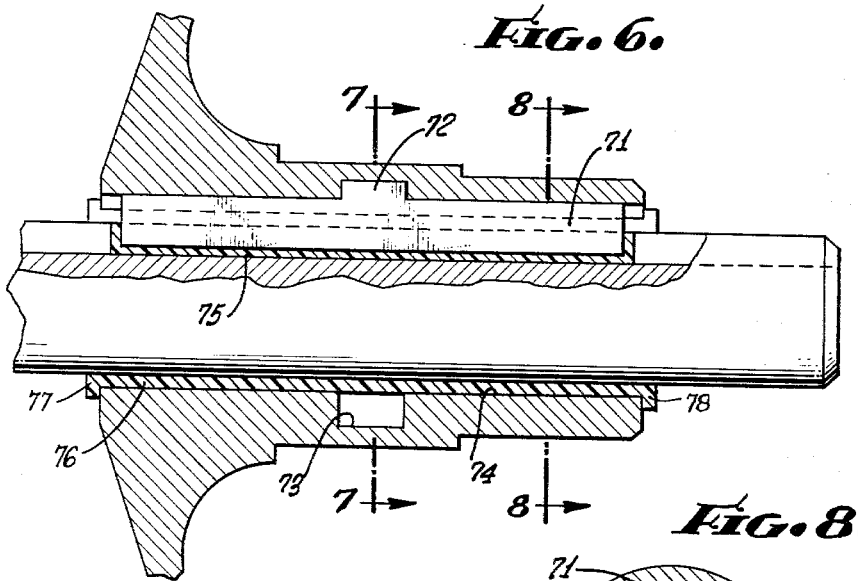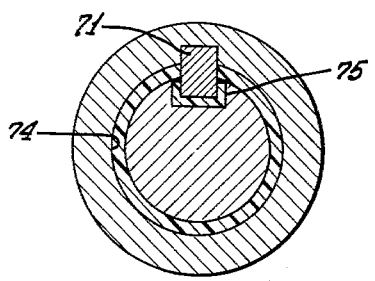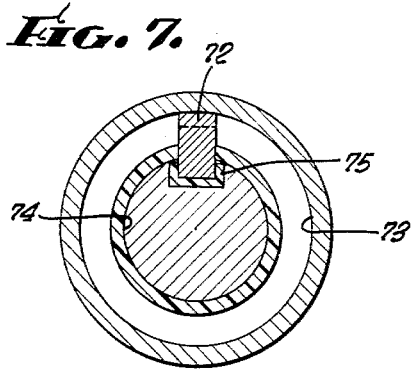

United States Patent Office 3,250,553
Patented May 10, 1966

1

3,250,553
NESTED KEY CONSTRUCTION FOR SLIDABLE PULLEY SECTIONS
Willard R. Detwiler, Inglewood, Calif., assignor to The Emerson Electric Manufacturing Company, St. Louis, Mo., a corporation of Missouri
Continuation of application Ser. No. 332,606, Dec. 23, 1963. This application June 8, 1965, Ser. No. 465,249
3 Claims. (Cl. 287—52.05)

This is a continuation of application Serial No. 332,606, filed December 23, 1963, now abandoned.

This invention relates to a variable ratio transmission mechanism, and particularly to a slidable key construction for the axially movable section of a variable diameter pulley structure.

In Patent No. 3,138,032 of Vito Raso et al., granted June 23, 1964, entitled, "Axially Adjustable Drive Mechanism," a molded plastic bushing such as Nylatron or Teflon having a low coefficient of friction is shown for lining the hub bore of the slidable pulley section in order to minimize frictional drag between the pulley section and the shaft. Furthermore, a plastic key molded of similar material and carried by the slidable pulley section is used in order to minimize frictional drag at the side surfaces of the key. The key, however, is subject to rather high shearing forces as it transmits torque between the shaft and the pulley section. Plastic materials such as Nylatron or Teflon, useful in reducing frictional drag, unfortunately have low shear strength. To prevent failure under load conditions, it has been proposed to increase the size of the key. This is not a particularly effective solution since this requires increase in size of other parts. Furthermore, the larger the key, the more difficult is the task of molding due to factors such as uniformity and shrinkage.

Accordingly, the primary object of this invention is to provide a composite key structure so designed that one part, made for example of steel, resists the shearing forces, whereas another part, such as molded plastic material, provides the requisite low friction drag at the side surfaces of the key. The plastic part is not required to resist shear, and the metal part does not slide along any other metal parts.

This invention possesses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but is to be understood that this detailed description is not to be taken in a limiting sense, since the scope of the invention is best defined by the appended claims.

Referring to the drawings:

FIGURE 1 is a fragmentary axial sectional view of a pulley section slidably mounted upon a shaft;

FIG. 2 is an exploded pictorial view illustrating components of the bushing and key structure;

FIG. 3 is a sectional view taken along a plane corresponding to line 3—3 of FIG. 1;

FIGS. 4 and 5 are enlarged fragmentary sectional views showing modified nested key constructions;

FIG. 6 is a fragmentary sectional view similar to FIG. 1 and showing a nested key construction of modified form; and FIGS. 7 and 8 are transverse sectional views taken along planes corresponding to lines 7—7 and 8—8 of FIG. 6.

In FIG. 1 there is illustrated a shaft 10 that, by way of example, may be rotated by a suitable motor not shown.

2

Mounted upon the shaft is a variable diameter pulley structure. The variable diameter pulley structure incorporates at least one axially movable pulley section 11 having a conical face 12 adapted to cooperate with an edge of a flexible belt.

The pulley section 11 has a hub 13 provided with a through bore 14. Mounted in the bore are two axially spaced bushings 15 and 16 made of suitable plastic material such as Nylatron or Teflon having low frictional characteristics with respect to the steel or other material of the shaft 10.

The bushings 15 and 16 (FIG. 2) have axial slots 17 and 18 that may be aligned with a keyway 19 formed in the shaft 10. The bushings are attached to the pulley section 11 by the aid of a pair of integral collars 20 and 21 that fit spaced interior annular grooves 22 and 23 in the hub bore 14. Accordingly, as the pulley section 11 is moved along the shaft, the bushings 15 and 16 are carried therewith and slide along the exterior surface of the shaft 10.

In order to establish a rotary coupling between the pulley section 11 and the shaft 10, a key structure is provided. The key structure is made in two parts, a metal part 24 and a molded plastic part or nest 25. The molded plastic part 25 is generally in the form of a rectangular parallelepiped having a width and height corresponding to that of the keyway 19 and slidably fitting therein. (See FIG. 3.) The plastic nest 25 has an elongated rectangular recess 28 (FIG. 2) that opens radially outwardly when the nest is in the keyway 19. The recess 28 is almost as large as the nest itself, only thin wall sections about the recess remaining.

The metal key part 24 is generally of a rectangular parallelepiped configuration but with projections 29 and 30 at opposite ends both extending upwardy at the top of the key. The metal key part 24 has a length and width corresponding to the length and width of the nest recess 28, but its height exceeds that of the recess 28. The key part 24 is thus partially accommodated in the nest recess 28, and a coupling therebetween is established so that the key parts slide together in the keyway 19.

The upper part of the metal key 24 that projects from the nest 25 is accommodated in a slot 31 formed in the hub bore 14. The ends of the slot 31 are radially enlarged, as at 32 and 33, to form outwardly facing shoulders 34 and 35 interlocked by the key part projections 29 and 30, thus to cause the key to move with the pulley section 11.

As shown in FIG. 3, the edges along the slots 17 and 18 of the bushings overlie the side walls 26 and 27 and contact the central portions of the metal key part 24 where it emerges from the nest 25.

As the shaft 10 is rotated, the side walls of the keyway 19 exert a compressive force upon the side walls 26 or 27 of the plastic nest 25 depending on the direction of rotation. Since the side walls 26 and 27 do not project upwardly beyond the keyway 19, no shearing force is imposed thereon, and the walls 26 and 27 are merely under a compressive load. The torque, however, is transmitted to the pulley section 11 by the metal key part 24 which has a substantial shear strength.

In the form of the invention illustrated in FIG. 4, the metal key part 51 has a reduced inner part 52 that fits in a rectangular aperture of the key nest 53. The side walls 54 and 55 of the nest 53 are flush with the walls of the upper projecting part of the metal key 51. In this instance, the edges along the axial slots of the bushings contact the metal key 51 intermediate its length, but do not overlie the side walls 54 and 55.

In the form of the invention illustrated in FIG. 5, the nest 61 is formed as a rectangular part having a through aperture 62 instead of a recess. The bottom of the metal key 63 in this instance is in contact with the bottom wall 64 of the keyway 65. However, the contact pressure in a radial direction is rather small and there is little frictional resistance to movement of the key. The lateral pressure, which is substantial under load conditions, is imposed upon the side walls 66 and 67 of the nest, and accordingly, the frictional resistance is reduced.

In the form of the invention illustrated in FIGS. 6 and 7, a metal key 71 is provided that has an intermediate projection 72 for fitting a central circular groove 73 formed in the hub bore 74 whereby the key structure is coupled to the slidable pulley section. The key nest 75 is similar to that illustrated in FIGS. 1–3. The bushing 76 is made in one piece, end flanges 77 and 78 of the bushing interlocking the pulley section at opposite ends of the hub bore.

The inventor claims:

1. In combination: a shaft; a pulley member having a hub, said hub having a through bore, the diameter of which is greater than that of said shaft, said shaft extending through said bore and slidably mounting said hub; said shaft having a keyway provided with side walls and a bottom wall; a key carried by said hub, and having a part extending into said keyway, the width of said extending part being less than the distance between the side walls of said keyway; the length of said key being substantially less than that of said keyway; and a one piece moldable plastic liner fitted in and slidable along said keyway; said liner having opposite side walls respectively slidably engaging the side walls of said keyway; said liner having a radially outwardly opening recess into which said key part is received; said liner having ends fitted over the ends of said key part whereby a coupling is established between the liner and the key for conjoint movement of the liner and said key axially of the shaft; said linear having a radial extent less than half the said diameter of said hub bore, and being confined between the hub bore and the bottom of said keyway whereby relative radial movement between the liner and the key is prevented; said key being made of material having a relatively high shear strength as compared with said liner; said liner being made of material having a susbtantially lower coefficient of friction with respect to said keyway than does said key; said liner entirely clearing the hub whereby the said liner is free of the imposition of shear forces due to the transmission of torque between the members.

2. The combination as set forth in claim 1 in which said liner has one elongate side slidably engaging the bottom of said keyway, said recess being formed in the opposite elongateside of the liner.

3. The combination as set forth in claim 1 in which said recess is formed as an opening extending entirely through said liner.

References Cited by the Examiner
UNITED STATES PATENTS

| | | |
|---|---|---|
| 2,120,383 | 6/1938 | Watson. |
| 2,892,503 | 6/1959 | Hood et al. _____ 170—173 |
| 3,024,502 | 3/1962 | Howard _____ 309—3 X |
| 3,045,763 | 7/1962 | Perrott _____ 170—160.54 |
| 3,115,696 | 12/1963 | Evans. |
| 3,122,384 | 2/1964 | Luenberger _____ 287—52.05 X |
| 3,138,032 | 6/1964 | Raso et al. _____ 287—52.05 X |

FOREIGN PATENTS

| | | |
|---|---|---|
| 929,544 | 6/1955 | Germany. |

EDWARD C. ALLEN, *Primary Examiner.*

A. V. KUNDRAT, *Assistant Examiner.*